Dec. 23, 1930. M. H. CRIMMINS 1,786,106
TWO-CYCLE INTERNAL COMBUSTION ENGINE AND SUPERCHARGING DEVICE
Original Filed June 14, 1926    3 Sheets-Sheet 2
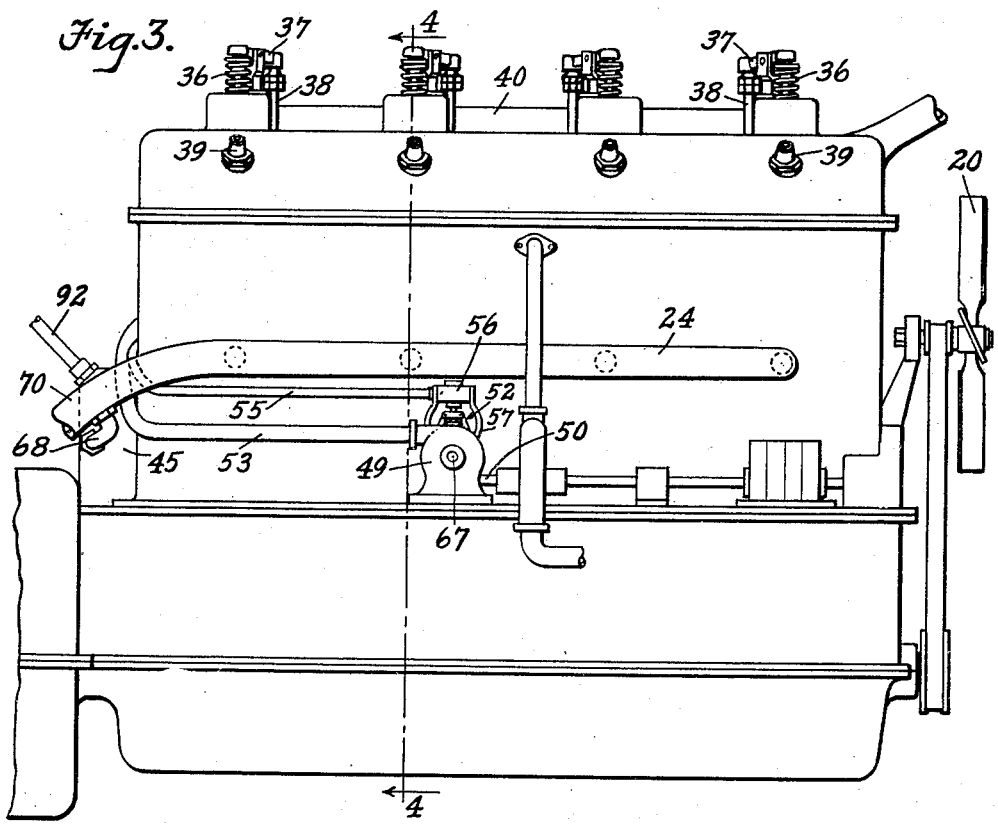
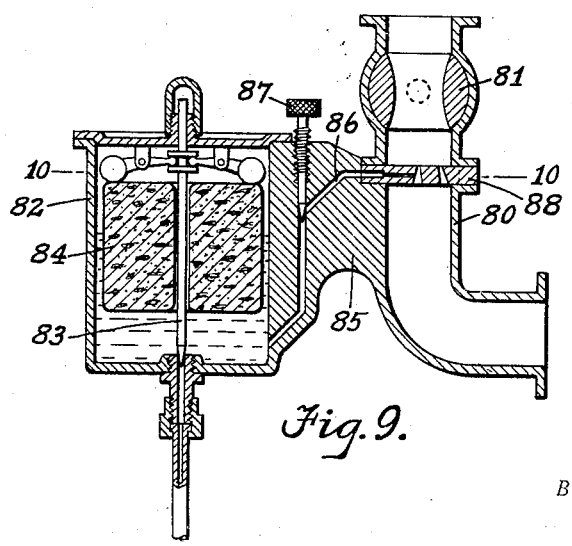
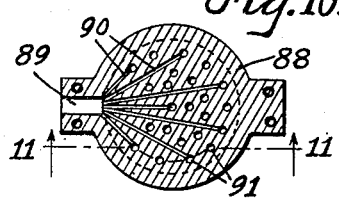
INVENTOR,
Murrell H. Crimmins
BY
ATTORNEY.

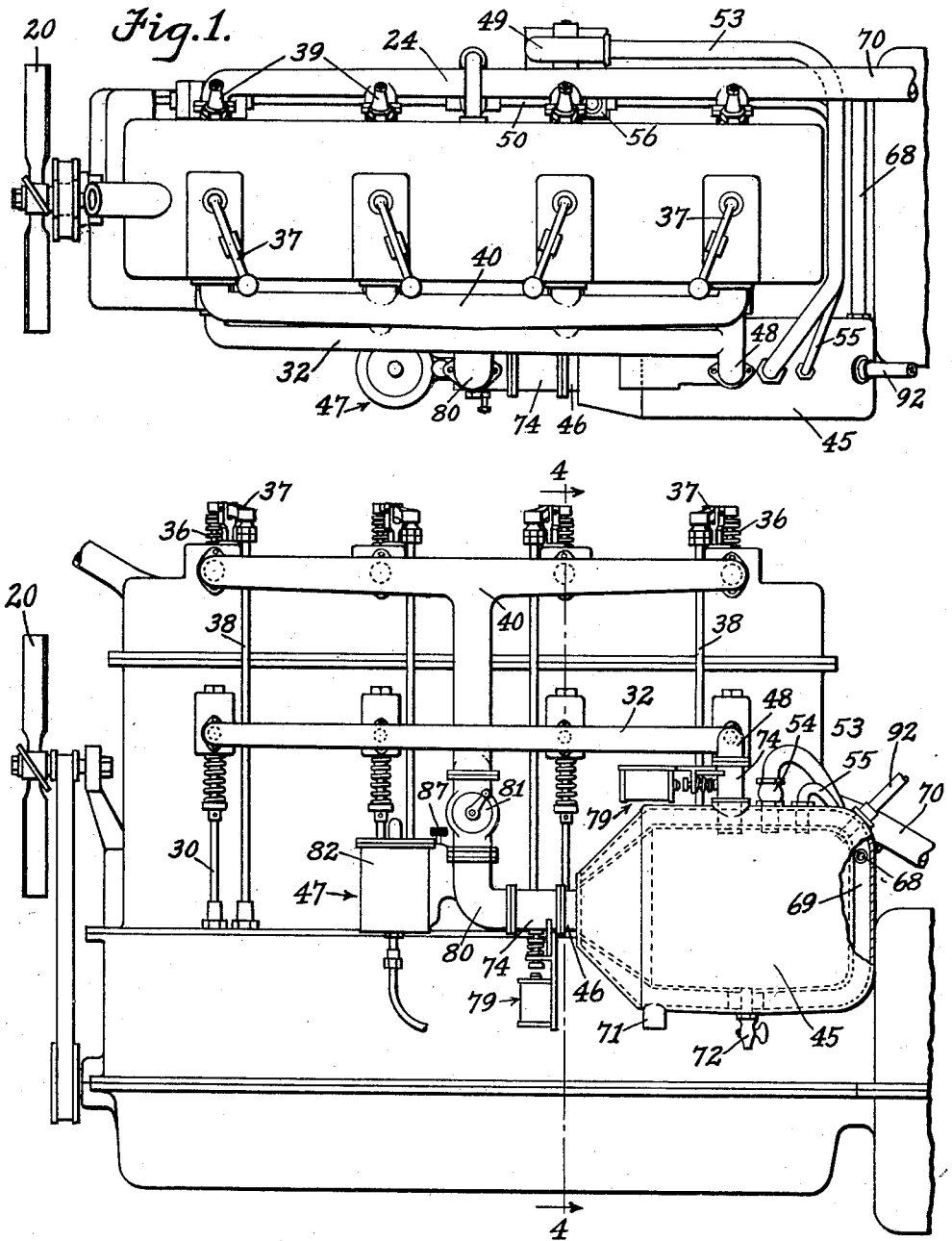

Dec. 23, 1930.   M. H. CRIMMINS   1,786,106
TWO-CYCLE INTERNAL COMBUSTION ENGINE AND SUPERCHARGING DEVICE
Original Filed June 14, 1926   3 Sheets-Sheet 3
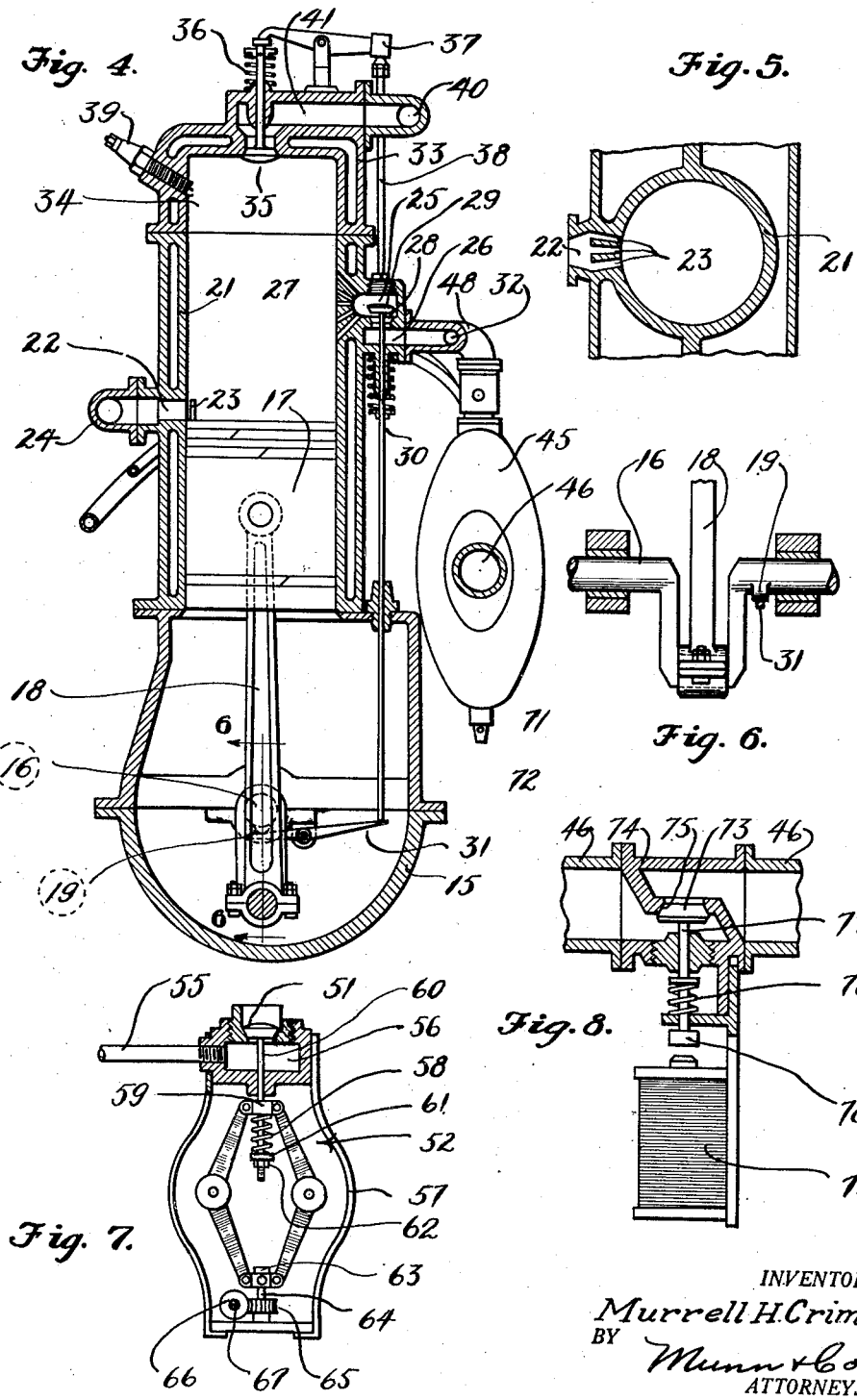
INVENTOR.
Murrell H. Crimmins
BY
Munn & Co.
ATTORNEYS.

Patented Dec. 23, 1930

1,786,106

UNITED STATES PATENT OFFICE

MURRELL H. CRIMMINS, OF LOS ANGELES, CALIFORNIA

TWO-CYCLE INTERNAL-COMBUSTION ENGINE AND SUPERCHARGING DEVICE

Continuation of application Serial No. 115,740, filed June 14, 1926. This application filed January 30, 1929.
Serial No. 336,512.

My invention relates to internal combustion engines and more particularly to a two-cycle, single-valve, supercharged internal combustion engine, with supercharging device. This case is a continuation of my application Serial No. 115,740, June 14, 1926.

The primary object of my invention is to provide an internal combustion engine of exceptionally high efficiency for general use, but which is particularly adapted for use with automobiles, airplanes, motor boats and the like.

A further object is to provide a supercharging device, for two-cycle internal combustion engines, whereby the fuel gas is forced into the cylinders and the consumed gases are swept out of them by a current of pure air. For automotive, motor boat, and other uses, to which this motor may be put for ground use, the supercharging device acts as a fuel-injecting-force regulator so arranged that, as the engine speed increases, the fuel-injecting-force increases proportionately, thereby insuring the delivery of a uniform mixture and quantity of fuel to the cylinders regardless of engine speed. For aviation, and other air uses, in addition to the above advantage, it has the additional advantage of being able to supply a uniform quantity of fuel to the cylinders at all altitudes. It will be seen that a motor of this design will develop as much power at highest altitudes as it will at sea-level, because it is not directly dependent upon atmospheric pressure for its fuel supply.

I have found out that when a combustible mixture is forced into a combustion chamber of an engine of small bore under pressure, this chamber having the same cubical contents as a combustion chamber in a standard engine, the small piston in this engine will have the same number of heat units behind it as in the other combustion chamber, and therefore the resulting power delivered to the small piston will be tremendously increased.

In addition, a small piston reduces the weight of the engine, reduces the vibration of moving parts, cuts down the friction and also allows for a much higher compression ratio of the combustible charge.

A two-cycle motor of this design should develop from three to eight times as much power per pound of weight as the present type of four-cycle engine. Within reasonable limitations no change in the diameter of the piston is necessary to increase the power of this type of motor. For example, to match the power output of the present type motors that range from a two-inch bore to four-inch bore, I would use a piston of one diameter which would be the smallest that is practicable for working conditions, i. e., two and one-quarter to two and one-half inches in diameter. To get the power now developed in a motor of four-inch bore from this small piston would necessitate the same length of stroke plus the same combustion chamber capacity plus a small increase in fuel injecting air pressure.

The feature which I call novel is the provision of a combustion chamber equal in capacity to combustion chambers of standard engines and a piston of small diameter movable in said chamber. The other feature is the forcing of a combustible gas into the combustion chamber under pressure ranging from at least fifteen pounds up to about forty pounds.

Because of the speed with which the air, under pressure, is forced through the carburetor, it is necessary to use a specially designed carburetor to insure the proper mixture of fuel and air. The carburetor, which is a part of this engine, is so designed that the most thorough mixture possible is attained, which not only increases the efficiency of the engine as a whole but also greatly increases its economy of operation.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof.

Figure 1 is a plan view of an engine embodying the principles and features of my invention.

Figure 2 is a left side view, in elevation of the engine shown in Figure 1, with part of the air reservoir broken away.

Figure 3 is a right side view of the engine.

Figure 4 is a somewhat enlarged transverse sectional view of the engine, taken approximately on line 4—4 of Figures 2 and 3.

Figure 5 is a transverse, horizontal sectional view of one of the cylinders, the section being taken through the exhaust part thereof.

Figure 6 is a section along the line 6—6 of Figure 4.

Figure 7 is a view, partly in section and partly in elevation, showing the pressure control valve and the regulating governor.

Figure 8 is a view, partly in section and partly in elevation, showing the magnetically operated retaining valve placed between the air reservoir and the carburetor.

Figure 9 is an enlarged vertical sectional view, taken longitudinally, through the middle of the carburetor.

Figure 10 is a further enlarged sectional view, taken on line 10—10 of Figure 9, through the perforated mixing-plate of the carburetor.

Figure 11 is an edge view of the perforated mixing-plate, partly in section on line 11—11 of Figure 10.

Certain parts of my engine are similar to those of internal combustion engines in general, such parts being the crank case 15, the piston 17, the connecting rod 18, and the cooling fan 20. No new features are claimed in connection with any of these.

The cylinders 21 are water-jacketed throughout their length and are made with an exhaust port 22 in one side thereof, at a point just above the top of the piston when in its lowermost position, which communicates with the interior of the cylinder through several vertical slots 23 in the cylinder walls. An exhaust manifold 24, communicating with ports 22 is attached to the side of the engine in the usual way.

An air-chamber 25 and inlet port 26 are formed on the opposite side of each cylinder from exhaust ports 22, at approximately the middle point of the combined combustion and cylinder spaces, when the piston is in its lowermost position. A series of diverging air ducts 27 is made in the cylinder wall between the air chamber and the interior of the cylinder, the ducts being so formed as to direct air into every part of the space occupied by the consumed gases.

An opening between the air-chamber 25 and the inlet port 26, provided with a valve seat 28 and a valve 29, operated by a push-rod 30 which extends downwardly into the crankcase so as to engage with a lever 31 bearing on the regular crank shaft 16, is adapted to close the opening. An air manifold 32, communicating with the ports 26 of the several cylinders, is attached to the side of the engine.

The cylinder head 33 is made comparatively deep so as to provide a relatively large combustion space 34 and the inlet valve 35 is placed in the top and center of the cylinder head. Valve 35 is opened by lever similar to 31 which is in turn operated by a cam on the crank shaft thereby eliminating cam-shaft and gears and allowing for higher and faster opening of inlet valve.

The basic principle of this invention is to get away from atmospheric air pressure as the governing factor in the amount of fuel mixture supplied to the combustion chamber. The number of heat units delivered to a specific cylinder of present design motors is dependent upon the size of the cylinder, its bore, and the stroke of the piston therewithin. In order to increase the power of the piston, the bore or the stroke or both must be increased. The motive force of an engine should be controlled by the number of heat units supplied to the cylinders. I have found out that a motor of two-inch bore and a four and one-half inch stroke can be made to develop as much power as a motor of four-inch bore and a four and one-half inch stroke simply by making the combustion space of the small motor equal in size to that of the large motor and by forcing the same quantity of fuel mixture into the small motor as is sucked into the larger one. Since the power charges and the stroke lengths in these two motors are the same, the power developed should be the same, with all the advantages on the side of the small motor because of less weight, friction and vibration.

It is for this reason that I provide in the present engine a comparatively deep combustion chamber in order that the space in this chamber will be the same as in standard engines even though the piston is much smaller in diameter than the standard piston.

The inlet valve is held closed by a spring 36 and is opened by a rocker-arm 37 which is actuated by a push-rod 38 extending downwardly therefrom into the crank case where it is engaged by rocker arm (similar to 31) which is operated by a cam on crank shaft 16 similar to cam 19. Spark plugs 39 are mounted in the side of the cylinder heads, as shown in Figure 4. An intake manifold 40 communicating with the inlet ports 41 of the cylinder heads is attached to the side thereof as shown in Figures 1, 2, and 4.

The supercharging device comprises an air reservoir 45, with a connecting pipe 46 to the carburetor 47, and a connecting pipe 48 to air manifold 32; an air compressor 49, geared to the magneto shaft or pump shaft 50, or any suitable part of the engine, and a pressure regulating valve 51, controlled by a governor 52 geared to a compressor shaft. A conducting pipe 53 carries the air from the compressor 49 to the reservoir 45, through a check-valve 54, and a return pipe 55 carries air from the reservoir back to the valve chamber 56 in which valve 51 operates.

Valve chamber 56 is supported by a frame or cage 57 in which the governor 52 revolves. As shown in Figure 7, the valve is held in its seated position by a compressed helical spring 58 whose tension may be varied by the action of the governor, the upper collar 59 of which is adapted to revolve and slip vertically on stem 60 of valve 51, while the lower end of the spring rests upon a washer 61 held on said stem 60 by a nut 62.

The lower collar 63 of the governor is fastened to a stub shaft 64 which carries a worm wheel 65 engaging with a worm 66 on the shaft 67 of the compressor 49.

The air reservoir 45 is jacketed as shown in Figure 2 and a pipe 68 connects the jacket space 69 thereof with the exhaust pipe 70 of the engine so that part of the hot gas flowing from the engine circulates around the air reservoir and heats the air contained therein. The exhaust gas escapes from the reservoir jacket through an outlet tube 71 fixed in the lower part thereof. This insures a uniform fuel temperature at all times which is particularly desirable for aviation at high altitudes and in winter flying. While I have shown a jacketed air reservoir, the same results can be accomplished by other equivalent structure. A blow-out valve 72 is fixed in the lower part of the air reservoir by which it may be drained.

Magnetically operated valves, as shown in Figure 8, are placed in pipes 46 and 48 to retain a supply of compressed air in the reservoir for the purpose of facilitating the starting of the engine and also to prevent suction of gas when descending a grade on compression with the ignition switch open. The valve 73 is arranged in a pipe section 74 to close against the air pressure in the air reservoir and is held against its seat 75 by a compressed helical spring 76, as shown. The projecting end of the valve stem 77 is equipped with an iron knob or disc 78 and an electro-magnet 79 is fixed adjacent thereto so as to attract the disc 78 and pull the valve 73 open, when current is caused to flow through the magnet coil. The magnet coils are connected in the ignition circuit (not shown) in such a manner that the magnets are energized when the ignition switch is turned on. While I have shown magnetically operated valves, in those engines having no storage battery, these valves will be operated from the switch key in the same manner, except that they will be opened and closed by a mechanical lever instead of electricity.

The carburetor consists of a sectional mixing tube 80 connected directly to intake manifold 40 and through a valve section 74 to the air reservoir 45. A throttle-valve 81 is placed in the upper section of the mixing tube.

A gas reservoir or float chamber 82, with a needle valve 83 and float 84 to control the inflow of gas from the supply tank (not shown), is connected by a web 85 to the mixing tube and a duct 86, in the connecting web, leads from the reservoir to the mixing tube. A regulating valve 87 is screw-seated in the web so as to project into duct 86 and restrict the flow therethrough. A perforated mixing-plate 88, with a bore 89 in one end adapted to coincide with the duct 86, is fixed between the upper and lower sections of mixing tube 80. A series of ducts 90, diverging from bore 89 to various points of the plate, are formed in the middle plane thereof and tapering perforations 91, some of which intersect said diverging ducts, as shown in Figures 10 and 11, are made through the plate at oblique angles thereto, so that their axis converge toward the axis of the mixing tube immediately above the plate when the latter is fixed in place as shown in Figure 9. These conical perforations, being large where the air enters, and small where the air emerges, have a nozzling effect on the compressed air rushing through them. All converging, as they do, towards a common center immediately above the plate 88, a violent crisscrossing of the air currents results. This action completely breaks up the fuel and mixes it thoroughly with all the air passing into the cylinders.

A pressure tube 92, connecting the air reservoir 45 with a pressure gauge (not shown), mounted on the dash or instrument board of the automobile, may be provided as shown in Figures 2 and 3.

In the operation of the engine, it will be seen that the pistons act as valves in connection with the exhaust ports of the engine. The cam shaft is a part of the crank shaft as will hereinafter be set forth. Cams 19 are set to open air valve 29 simultaneously with the opening of exhaust port slots 23, which occurs in the lowermost position of the pistons, during the revolution of the cranks through an arc from one side to the other of the lower dead center, and to close the valves a trifle before the exhaust slots are closed.

The inlet valve cams (not shown) are arranged for quick opening of inlet valves 35, directly after the closing of port slots 23, and for holding them open a relatively short period of time.

Air pressure is maintained in the air reservoir 45 by the operation of the compressor while the engine is running and by the retaining valve 73 when the engine is at rest. When the ignition switch is turned on magnets 79 act to open valves 73 so that compressed air is allowed to flow directly into air manifold 32 and through the carburetor into intake manifold 40. As the air rushes through perforations 91 in mixing plate 88, it draws gas through ducts 90 therein and produces a thorough mixing of gas and air, owing to the force and converged direction of the various currents passing through the mixing plate.

When the inlet valve 35 opens, the fuel gas is forced through inlet ports 41 into the cylinder space and after valve 35 closes, it is compressed into combustion space 34 by the upward movement of the piston 17. The explosion of the gas by spark plug 39 is timed in the usual way, and as the piston moves to its lowermost position, exhaust port slots 23 are opened. Air valve 29, being opened simultaneously, compressed air is permitted to flow through divergent ducts 27 so as to sweep the consumed gases out of the cylinder and combustion spaces so that practically pure air, only, remains in the cylinder as the piston begins its upward movement. In consequence of this action all danger of pre-ignition is eliminated. As the piston moves upwardly valve 29 and port-slots 23 are closed, valve 35 is opened and the cycle is repeated.

Valve 51 in air chamber 56 acts as a pressure regulating valve. When the engine speed increases, the fly-ball governor 52 operates to increase the tension of spring 58 so that the compression of the air in reservoir 45 tends to increase, and vice versa; so that the pressure of the compressed air varies in accommodation of the speed of the engine. This higher air pressure at high engine speed insures a full supply of fuel to the combustion chamber in spite of the faster action of the valves because of the greater injecting force of the air. The air-compressor is so designed and geared that it is always pumping more air than the engine requires. The surplus air is discharged through valve 51, which acts in a manner similar to a steam engine safety valve. When used for aviation purposes, this surplus of air compensates for rarity of atmosphere at high altitudes, making it possible for the engine to still be able to deliver sea-level horsepower. For extremely high altitudes the engine can be equipped with an additional compressor to be used only at these exceptional altitudes.

While I have shown a four-cylinder engine, it will be seen that similar engines of two, three, six, eight or any number of cylinders may also be built and while I have shown a water cooled cylinders-in-line engine, it will be seen that it can also be made in radial form and air cooled. I have shown only one carburetor, in connection with the compressed air reservoir, it will be seen that extensions may be added for connection with two or more carburetors, if desired.

The crank shaft 16 is provided with a cam 19 for actuating the fresh air inlet valve 29. The valve 29 is mounted upon a push rod 30, the rod in turn bears upon a rocker arm 31. The crank shaft cam 19 does away with the cam shaft. As the piston approaches the end of the firing stroke, this cam depresses one end of the rocker arm 31. The other end of the rocker arm is raised proportionately, which action is transmitted to the valve.

In order to give air inlet valve 29, and fuel inlet valve 35 wide, quick openings, the rocker arm 31 and the rocker arm similar to it (not shown) are suspended from the engine frame at a point about one-third of their length from the crank shaft, two-thirds from the valve stem. The desired width and speed of the valve opening can be gained in this manner, without using a large cam on crank shaft.

I claim:

1. The combination, with the piston cylinder of a two-cycle internal combustion engine; of an air chamber adjacent to said cylinder at the side thereof at approximately the middle point of the combined combustion and cylinder spaces, when the piston is in its lowermost position, there being a series of air ducts leading from said chamber through the wall of said cylinder, said air ducts as they pass from said chamber to said cylinder diverging sufficiently to direct air under pressure at an upward inclination and at a downward inclination into every part of the space occupied by the consumed gases, means to supply compressed air to said chamber under pressure, and means timed to supply and cut off the compressed air as required.

2. The combination, with the piston cylinder of two-cycle internal combustion engine; of an air chamber adjacent said cylinder, there being a series of air ducts leading from said chamber through the wall of said cylinder, said air ducts as they pass from said chamber to said cylinder diverging in such a manner as to direct air under pressure toward opposite end portions of said cylinder, and means timed to control the supply of compressed air for said cylinder.

3. An internal combustion engine comprising a plurality of cylinders, pistons mounted in said cylinders and having very small diameters, the stroke of the pistons being substantially the same as pistons in standard engines, and the combustion chambers of said cylinders having substantially the same capacity as combustion chambers in standard engines, means for injecting a combustible mixture into said combustion chambers under pressure, a carburetor for delivering the combustible mixture, said carburetor including an air passageway, a disc extending transversely thereacross, and having a plurality of conical-shaped openings therein, said openings being inclined for criss-crossing the air passing therethrough, and means for delivering fuel to certain of said openings.

4. An internal combustion gasoline engine of the two-cycle type comprising a cylinder having a fuel inlet tappet valve in its head, said tappet valve being operated by crank shaft which acts as cam shaft, a storage tank for air, communications between said tank and said inlet valve, and a valve for automatically closing the outlet of said tank when the engine is stopped and opening the outlet when engine is started.

5. An internal combustion gasoline engine of the two-cycle type comprising a cylinder having a fuel inlet tappet valve in its head, said tappet valve being operated by crank shaft which acts as cam shaft, a storage tank for air, communications between said tank and said inlet valve, a valve for automatically closing the outlet of said tank when the engine is stopped and opening the outlet when the engine is started and automatic means for increasing the pressure of the air within the storage tank as the speed of the engine increases.

6. An internal combustion gasoline engine of the two-cycle type comprising a cylinder, a heated storage tank for air, communications between said tank and said cylinder, a valve for automatically closing the outlet of said tank when the engine is stopped and opening the outlet when the engine is started, automatic means for increasing the pressure of the air within the storage tank as the speed of the engine increases, and means for supplying a uniform full sea-level fuel injecting air pressure at all altitudes.

MURRELL H. CRIMMINS.